UNITED STATES PATENT OFFICE.

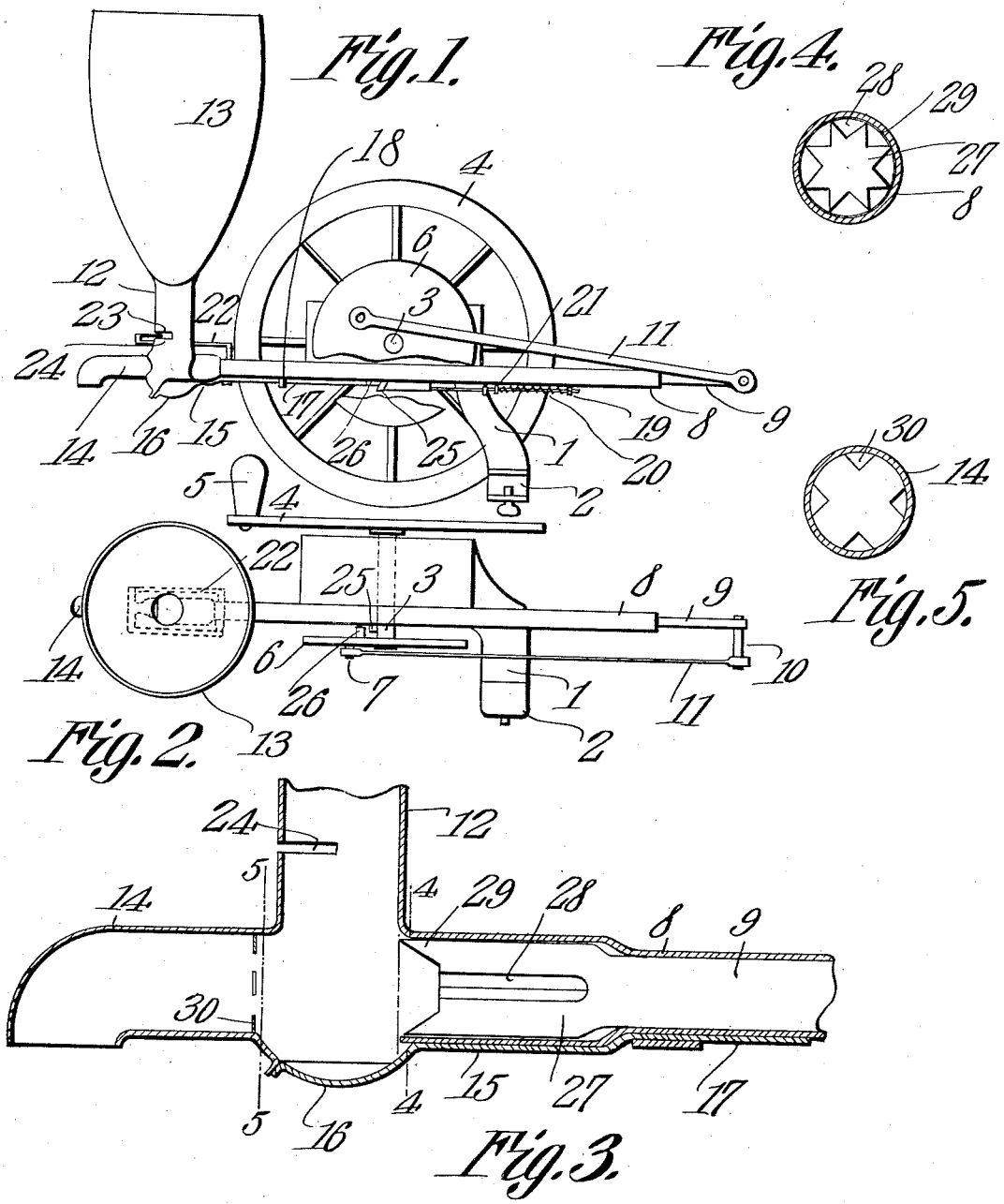

SIDNEY R. SMITH, OF LITTLETON, COLORADO.

CHERRY-SEEDER.

958,780.  Specification of Letters Patent.  Patented May 24, 1910.

Application filed July 8, 1909. Serial No. 506,576.

*To all whom it may concern:*

Be it known that I, SIDNEY R. SMITH, a citizen of the United States, residing at Littleton, in the county of Arapahoe and State of Colorado, have invented a new and useful Cherry-Seeder, of which the following is a specification.

This invention has relation to cherry seeders, and it consists in the novel construction and arrangement of its parts, as hereinafter shown, described, and claimed.

The object of the invention is to provide a simple and an effective device for removing seeds from cherries and for separating the seed from the seeded fruit.

In the accompanying drawing:—Figure 1 is a side elevation of a cherry-seeder with parts broken away. Fig. 2 is a top plan view of the same. Fig. 3 is a vertical sectional view through the lower portion of the barrel of the cherry seeder and the adjacent parts. Fig. 4 is a transverse sectional view of Fig. 3, cut on the line 4—4 thereof. Fig. 5 is a transverse sectional view, cut on the line 5—5 of Fig. 3.

The cherry-seeder includes a bracket 1, which is provided with a clamp 2 adapted to be applied to the top of a table or other support. A shaft 3 is journaled for rotation in the bracket 1. A wheel 4 is fixed to one end of the said shaft and is provided with a crank handle 5. A disk 6 is attached to the other end portion of the said shaft 3 and is provided upon its outer side with a wrist-pin 7. A tubular arm 8 is supported by the bracket 1, and a rod 9 is mounted for reciprocatory movement in the said arm 8. At its outer end the rod 9 is provided with a laterally disposed pin 10. A pitman rod 11 is pivoted at one end to the wrist-pin 7, and at its other end to the pin 10. A barrel 12 is attached to one end portion of the tubular arm 8, and a hopper 13 is mounted upon the upper end of the said barrel 12. A seed delivery spout 14 communicates at one end with the lower portion of the barrel 12, and is located in alinement with that end of the tubular arm 8 which communicates with the said barrel. A bottom member 15 normally closes the lower end of the barrel 12 and is approximately spoon-shaped as at 16 at that part which is adapted to project under the lower end of the said barrel. The bottom member 15 is provided with a shank 17 which extends longitudinally along the tubular arm 8. The said shank portion 17 is located in the guide 18 which depends from the arm 8, and at that end of the shank 17 opposite the end thereof which is provided with the spoon portion 16, a coil spring 20 surrounds the same and is interposed between a guide 19 and a stop 21, fixed to the said shank 17. The said coil spring 20 is under tension with a tendency to hold the spoon-bowl portion 16 under the lower end of the barrel 12. An arm 22 is attached to the shank 17 of the bottom member and is provided with a valve 23, which is adapted to be projected through an opening 24, provided in the lower portion of the barrel 12. A lug 25 is mounted upon the shank portion 17 of the bottom member and lies in the path of movement of a lug 26, which is carried upon the inner surface of the disk 6. The said lugs 25 and 26 have chamfered inner surfaces, as indicated in Fig. 1 of the drawing.

At its inner end the reciprocatory arm 9 is provided with an enlarged head 27, which is provided in its side with a series of longitudinally disposed grooves 28. The said head is also provided at its end with a series of pointed projections 29. Upon the inner surface and at the inner end of the seed delivery spout 14 is located a series of prongs 30, which are adapted to enter the grooves 28 when the said rod 9 is moved longitudinally, and the pointed extremities 29 of the head 27 are projected into the inner portion of the seed delivery spout 14.

From the above description it will be seen that when the cherries are poured into the hopper 13 they will pass down in a vertical line into the upper portion of the barrel 12. As the shaft 3 is rotated through the instrumentality of the wheel 4 and the crank handle 5, the rod 9 is reciprocated through the connecting parts 6, 7 and 10. Thus the lowermost cherry in the barrel 12 is engaged by the projections 29 of the head portion 27 of the rod 9 and the said cherry is forced against the prong 30 in the seed delivery spout 14. As the rod 9 continues in its movement toward the said prongs the seed is squeezed from the fruit and passes between the prongs 30. The rod 9 then retreats from the prongs 30, and the said prongs prevent the seed from following the same back, but permits the seeded fruit to fall in the bowl portion 16 of the bottom member 15. At the time that the head portion 27 advances toward the prongs 30 and the spout 14, the valve 23 moves out of the opening 24 in the barrel 12, and consequently the column of cherries is sustained upon the upper side of the enlarged portion 27 of the rod 19. When, however, the rod 19 moves away from the prongs 30, the valve 23 enters the opening 24 in the barrel 12 and passes between the lowermost cherry therein and those above. Consequently, the cherries above the lower cherry in the said barrel are sustained, while the lower cherry is free to fall down into the bowl portion 16 of the bottom member 15. By reason of the fact that the lower cherry has been seeded it falls into the bowl portion 16 in a collapsed condition. Upon the next forward movement of the rod 19 the cherry just deposited in the said bowl portion 16 is operated upon in the manner above indicated. The lugs 25 and 26 are so positioned with relation to each other that as the disk 6 rotates the bottom portion 15 is moved from under the barrel 12 after a cherry has been seeded, and is located in the bowl portion 16 of the bottom member 15, and while the projections 29 of the head 27 of the rod 26 are in engagement with a cherry and are extracting a seed from the same. When the rod 9 moves away from the projections 30 the bottom 15 closes and receives the seeded cherry and holds the same until another cherry is impinged between the head portion 27 of the rod 9, and the said prongs 30, when the said seeded cherry is liberated as indicated.

Having described my invention, what I claim as new, and desire to secure, by Letters Patent, is:—

A cherry-seeder comprising a hopper, a barrel for receiving cherries from the hopper, a seed-delivery spout communicating with the barrel, a reciprocatory member mounted for movement in alinement with the said seed-delivery spout, a reciprocatory bottom member mounted for movement under the barrel, a valve carried by the bottom member and adapted to interrupt the movement of the cherries through the barrel, and a crank mechanism operatively connecting the reciprocatory parts together.

In testimony that I claim the foregoing as my own, I have hereto affixed my signature in the presence of two witnesses.

SIDNEY R. SMITH.

Witnesses:
C. EBEL,
G. COOPER MOORE.